United States Patent
Fraser (10) Patent No.: US 11,112,778 B2
(45) Date of Patent: Sep. 7, 2021

(54) CLOUD AND DIGITAL OPERATIONS SYSTEM AND METHOD

(71) Applicant: AVEVA Software, LLC, Lake Forest, CA (US)

(72) Inventor: Darren Fraser, Cambridge (GB)

(73) Assignee: AVEVA SOFTWARE, LLC, Lake Forest, CA (US)

(*) Notice: Subject to any disclaimer, the term of this patent is extended or adjusted under 35 U.S.C. 154(b) by 64 days.

(21) Appl. No.: 16/566,672

(22) Filed: Sep. 10, 2019

(65) Prior Publication Data

US 2020/0081420 A1 Mar. 12, 2020

Related U.S. Application Data

(60) Provisional application No. 62/729,352, filed on Sep. 10, 2018.

(51) Int. Cl.
| | |
|---|---|
| *G06N 20/00* | (2019.01) |
| *G06N 5/04* | (2006.01) |
| *G06N 99/00* | (2019.01) |
| *G05B 19/418* | (2006.01) |
| *G06F 8/75* | (2018.01) |

(52) U.S. Cl.
CPC ......... *G05B 19/41835* (2013.01); *G06F 8/75* (2013.01); *G06N 20/00* (2019.01); *G05B 2219/32331* (2013.01)

(58) Field of Classification Search
CPC .... G06Q 30/0201; G06Q 10/10; G06N 20/00; G06N 5/04; G06N 3/08; G06N 5/022; G06N 5/02; H04L 41/16; G06F 30/20; G06F 8/75; G06F 2119/06; G05B 19/41835; G05B 19/32331
See application file for complete search history.

(56) References Cited

U.S. PATENT DOCUMENTS

| | | | | |
|---|---|---|---|---|
| 9,031,824 | B2* | 5/2015 | Nasle | G05B 13/048 |
| | | | | 703/13 |
| 10,489,711 | B1* | 11/2019 | Inbar | H04L 41/142 |
| 2006/0224254 | A1 | 10/2006 | Rumi et al. | |
| 2008/0109205 | A1* | 5/2008 | Nasle | G06F 30/20 |
| | | | | 703/18 |
| 2009/0083204 | A1 | 3/2009 | Baier et al. | |
| 2014/0358845 | A1 | 12/2014 | Mundlapudi et al. | |

(Continued)

FOREIGN PATENT DOCUMENTS

KR    10-1310637 B1    9/2013

OTHER PUBLICATIONS

Abrol et al., Real-Time Stream Data Analytics for Multi-purpose Social Media Applications, 6 pages (Year: 2015).*

(Continued)

*Primary Examiner* — Thuy Dao
(74) *Attorney, Agent, or Firm* — Greenberg Traurig, LLP (57) ABSTRACT

The disclosure is directed to a system for integrating and centralizing multiple manufacturing software types into a consolidated platform. The system interfaces with third party software and performs data collection, data analytics, factory controls, virtual modeling, and checklist creation, as well as many other manufacturing applications. Artificial intelligence and machine learning are also integrated into the platform to assist with root cause analysis and increasing production efficiency.

18 Claims, 7 Drawing Sheets

(56) References Cited

U.S. PATENT DOCUMENTS

| | | | |
|---|---|---|---|
| 2015/0095830 A1* | 4/2015 | Massoumi | G06F 3/04842 |
| | | | 715/771 |
| 2015/0106753 A1 | 4/2015 | Tran et al. | |
| 2019/0012254 A1* | 1/2019 | Gupta | G06F 11/0766 |
| 2019/0129989 A1* | 5/2019 | Shih | G06F 16/116 |
| 2019/0188733 A1* | 6/2019 | Rao | G06N 20/00 |

OTHER PUBLICATIONS

International Search Report and Written Opinion for International Application No. PCT/US2019/050457, dated Dec. 26, 2019, 9 pages.

\* cited by examiner

CLOUD AND DIGITAL OPERATIONS SYSTEM AND METHOD

CROSS REFERENCE TO RELATED APPLICATION

This application claims the benefit of and priority to U.S. Provisional Patent Application No. 62/729,352, filed on Sep. 10, 2018, entitled "CLOUD AND DIGITAL OPERATIONS SYSTEM AND METHOD", which is hereby incorporated by reference for all purposes.

BACKGROUND

The current manufacturing environment relies on computer systems to store data and to control facility manufacturing processes. Companies use historical data from sources such as sensors and reports to create trends and graphs to predict future equipment and market behavior. As the world of analytics finds itself in a broader class of industry, a realization that the more data one gathers, the more likely it is to find anomalies or opportunities for improvement within a given process has become apparent.

However, advanced analytics is a complicated endeavor. Typically, a company relies on a small percentage of the workforce to transform data into a useful form. What's more, the small percentage of people may not have access to all the data sources, or truly understand what signals should be flagged as important. Often, the software capable of transforming and displaying data is only accessible by certain electronic hardware. This limited access results in rudimentary reports such as screenshots of analytics, with no capability for the reviewer to manipulate the data or interface with the data source. These limitations force those who must make the decision about the future of a company to use an incomplete overview to do so.

In addition, the cost of continuously upgrading and maintaining the onsite infrastructure to collect, store, and analyze data is of concern. Large scale operations scattered across the globe typically use onsite servers and data storage to handle their data needs. These services are at times provided by different vendors, resulting in different hardware, software, and training requirements for data management at each site. Often, incompatibility issues arise when trying to collect and analyze data from multiple sources on a global scale. Constancy between factories is further complicated by different human machine interfaces being used at different facilities for facility control operations.

Many companies are reluctant to move data collection and facility control operations to a central location where communication access is established to multiple remote locations using the internet, for example. There are legitimate concerns for this hesitation: foremost is security. While it may be possible to justify the cost of a centralized data and facility control facility, there is risk that a competitor may be able to gain access to the system and steal trade secrets. In addition, so called hackers may be able to gain access to the centralized facility and manipulate tool settings or wipe out entire systems, causing massive financial loss.

Another concern for having multiple factories controlled by a centralized system is that a data connection loss would render the remote business locations inoperable or cause quality issues within the final product. In fact, for this reason some industries are prevented by government regulations from having a cloud based data management system with no onsite infrastructure.

The development of a data collection and facility control system from the ground up has other shortcomings. While different third-party applications (apps) and software programs can be added to a system, communication between the different programs to create a seamless interface to access the data and controls that each can provide can be difficult to achieve.

The inability to integrate fully developed third party apps and programs into a data collection and control system can be detrimental to a company's success. Also, the inability to integrate virtual reality into the development process, for example, can give competitors that have access to virtual machines (VMs) an edge on development by eliminating the need for costly experiments and prototyping. Finding ways of integrating artificial intelligence (AI) into the analytics, design, and control process is becoming more desirable.

Therefore, there is a need for a centralized data analytics and facility control system.

SUMMARY

The present disclosure is directed to an advanced data analytics and manufacturing facility control server and system and its associated hardware and software (hereinafter the system). Though the system is described herein in the context of manufacturing, it is not limited to a manufacturing environment, and has utility in many other environments as well, such as business for example. The system, in some embodiments, can comprise a secure, managed solution for gathering, storing, visualizing and analyzing data. In some embodiments, the system can be an accessed by hardware and software located at an onsite facility. In some embodiments, the system can be accessed from a remote location (i.e. the cloud) by the onsite facility. In some embodiments, the system can run in a hybrid configuration at both the onsite location and from the cloud. In some embodiments, the onsite or cloud hybrid configurations can operate independently or in tandem with each other. In some embodiments, after a connection loss between the onsite and cloud locations the data collected by one location is copied to the other location so that both locations have data that is synced and matched after communication has been restored.

In some embodiments, configuring the system as a hybrid system offers many solutions to problems faced in industry today. In some embodiments, the ability to have access to the same system tools from both an onsite server and a cloud based server increases process robustness. In some embodiments, a hybrid configuration has the benefit of bandwidth conservation. For example, in some embodiments, videos with large gaps of insignificant data can be analyzed at a local server, the insignificant data separated, and the important data uploaded to the cloud for permanent storage. In some embodiments, the local server can store the data, and trickle the information to the cloud server as bandwidth becomes available. In some embodiments, the system comprises redundancy for critical applications where data is vital. In some embodiments, the system includes redundancy to protect the user's information by storing information both onsite and in the cloud.

In some embodiments, the system can comprise Artificial Intelligence (AI) and/or machine learning. In some embodiments, AI and/or machine learning can be used to recognize defects in products that previously could only be done with human analysis. In some embodiments, AI and/or machine learning analysis facilitates an increase in the number of samples that can be analyzed. In some embodiments, AI and machine learning can compare sample results to changes in upstream processes. In some embodiments, AI and/or machine learning provides root cause analysis and suggestions for fixing the issue.

According to some embodiments, AI and/or machine learning can analyze factory operations methods for different duty shifts. In various embodiments, factory operations comprise start-up and shut-down operations, steady state operations, product line changes, or any changepoint in a manufacturing and/or delivery process. In various embodiments, AI and/or machine learning compares different operator's methods during different operations. The AI can use operation data to suggest the most efficient or "best practice" for performing the operation according to some embodiments. In some embodiments, this allows for standardization across shifts and even across factories, which increases efficiency and quality. Some embodiments of the system include operations or applications, and/or digitalization that can deliver extended capabilities to the operator, and/or digitize manual processes across assets, engineering and operations, and/or enable mobility and access to data anywhere. Some usage or examples include product or shift changeover checklists, and/or incident management including historical case referencing, and/or collaboration with remote or scarce experts.

In some embodiments, the system allows users to discover valuable insights within their business or manufacturing environment. In some embodiments, the system setup requires no additional IT, staffing, or infrastructure. In some embodiments, the system can rely whole or in part on a cloud based applications and/or data storage. In some embodiments, the system can collect high fidelity, time-series data from multiple, disparate sensors and smart devices. In some embodiments, high fidelity, time-series data is stored within a secure cloud and/or onsite environment. In some embodiments, the system automatically uploads or downloads files during runtime to/from remote storage locations using a File Transfer Protocol (FTP) configured via scripting and/or the system interface.

In some embodiments, the system can collect equipment downtime event and/or production data from onsite manufacturing location through electronic devices and/or manual data entry. In some embodiments, users can use collected data to drive performance improvements using Key Performance Indicators (KPIs) and/or perform asset utilization root cause analyses in real time. In some embodiments, the system allows users to standardize and share best practices through onsite communications networks and/or in the cloud, so that users receive easily understandable power analysis and intelligent reporting tools via onsite displays or mobile devices. In some embodiments, the reporting can be accessed on demand, and/or through a newsfeed, improving the speed at which information is obtained. In some embodiments, customized reporting dashboards can be added in minutes.

In some embodiments, in addition to manufacturing facilities, the system can support scheduling and delivery services. In some embodiments, the system can store and analyze order data from consumers. In some embodiments, the system can be configured to predict events such as when a customer may run out of a product and/or resource, for example. In some embodiments, third parties, such as but not limited to customers, can access the system so that one or more of configurations, controls, and/or data can be uploaded, downloaded, or changed. In some embodiments, the system is used by the third party to evaluate trends like cost, delivery times, or any other parameter the user desires.

In some embodiments, the system can provide alarms for process anomalies. In some embodiments, the system can send online alarms or reports using any multi-media formats. In some instances, when an alarm comes up on HMI, a user can see the alarm on a screen, and/or request 3D location view of the asset, and/or transfer the task of equipment inspection to a mobile device, and/or receive a recommended route to location on a mobile device, and be made aware of safety concerns on the path. In some embodiments, in addition to viewing the equipment, the user can request location of components (e.g., such as isolation switches), and/or a location and/or zone can be tagged-out, so that all users or personnel are aware. Some embodiments include systems and methods for operation or process performance, such as a comparison of current vs benchmarking from SAT, and/or utilization vs expectation, etc.

In some embodiments, multi-media formats comprise PDF, for example. In some embodiments, alarms can be real-time and/or historical. In some embodiments, the system can log data in any format to any database. In some embodiments, the system can use one or more notifications to send customized alarms. In some embodiments, customized alarms are sent to electronic hardware. In some embodiments, electronic hardware comprises one more of computers, inboxes, printers, mobile devices, pagers, smartphones, and/or any devices capable of receiving digital data.

In some embodiments, the system can provide animation tools to improve the delivery of information. In some embodiments, the user can take command over graphics in a user friendly and intuitive interface. In some embodiments, the system allows users to paste images and rotate images dynamically using custom rotation points. In some embodiments, animation options include filling bar graphs with color, and/or adjusting the scale of objects. In some embodiments, system animation tools can comprise 'command' (for touch, keyboard and mouse interaction), hyperlink, text data link, color, resize, transparency, and position, as non-limiting examples.

In some embodiments, the system can comprise collaboration tools. In some embodiments, users can compare any file and/or merge changes from multiple developers. In some embodiments, the system supports one or more of versioning, source control, interaction, email, and encryption of stored and transmitted data. Some non-limiting example embodiments of functionality provided by the system include the ability to determine how to react to current variation based on past situations. Further, the system can provide all tools or applications surrounding day to day operations enable collaborating between team members (e.g., chat, messages, photos, etc.), provide location specific applications, the integration of applications (including any applications with 3rd parties), and provide asset chain and people chain functions.

In some embodiments, the system can log digital and/or physical events. In some embodiments, a log ensures traceability for operator initiated actions or internal system activities. In some embodiments, log event examples captured by the system can comprise one or more of security system changes (user logon or off), screen open/close, recipe/report operations, system warnings, and/or any tag value changes, including custom messages.

In some embodiments, the system brings the field operator into the automation loop by utilizing a combination of workforce management software, mobile handheld computers, monitoring devices and Radio Frequency Identification (RFID) equipment tags or bar codes. In some embodiments, this mobile framework results in a significantly improved decision support system for managing plant assets. In some embodiments, workers are easily guided through a question and answer process which helps uncover hidden bottlenecks and process or equipment problems. If problems are found, workers are immediately guided to solutions through additional steps or actions to properly identify and address the developing issue according to some embodiments. In some embodiments, the system can include built-in mobility, and can leverage a smart phone platform (camera, messaging, notification, GPS, etc.), provide location aware work activities & notifications, enable security, and convey information. In some embodiments, the system includes a "Mobile FIRST Productivity Suite" providing a set of mobile applications to perform all key plant functions. According to some embodiments, the system comprises AVEVA Mobile Operator Rounds®.

In some embodiments, the system can meet stringent traceability requirements such as set forth by the Food and Drug Administration (FDA). In some embodiments, users can take advantage of built-in functionality to create 21 CFR part 11 compliant projects with traceability and/or e-signatures. In some embodiments, the system traceability is used in pharmaceutical and/or food applications. In some embodiments, system traceability can be used for any application where traceability is a requirement or is desirable.

In some embodiments, the system can create screens and/or Human Machine Interfaces (HMIs) to meet any application requirement. In some embodiments, the system can combine animated objects to create any functionality required, and store graphics in a library for future use. In some embodiments, the system allows access of the same screen from multiple displays on multiple computers. In some embodiments, the system allows access of the same display content across different product lines. In some embodiments, the system providing of the same display across multiple locations and/or across product lines creates a consistent system "look and feel."

In some embodiments, the system supports a historian database. In some embodiments, the system optimizes trend history. In some embodiments, the system can incorporate data decimation into the historian database. In some embodiments, the system is designed to load values from Structured Query Language (SQL) Relational Databases. In some embodiments, the system provides tools that allow quick access to Statistical Process Control (SPC) values without any need for programming. In some embodiments, the historian database can be integrated into any manufacturing and/or business platform. In some embodiments, the historian database can be effectively accessed by multiple interface platforms from multiple vendors.

In some embodiment, the historian database comprises advanced data retrieval modes. In some embodiments, the modes can retrieve data and format the data into one or more of the following non-limiting examples: time-in-state; slope; interpolated; best fit; time-weighted average; integral; counter; cyclic and delta; full; minimum, maximum, average; value state; round trip; as well as any other desired format. In some embodiments, the advanced data retrieval mode can also replay one or more sets of data recorded within a time period. In some embodiments, the advanced data retrieval mode can align or offset timeframes from different data sets to evaluate time dependent process effects.

In some embodiments, the system comprises platform agnostic core runtime for Linux, VxWorks, and/or other embedded platforms. In some embodiments, platform agnostic core runtime allows the user to make intelligent embedded systems and add machines to one or more of the Internet of Things (IoT), Industrial Internet of Things (IIoT), "Industry 5.0," and/or other networks.

In some embodiments, the system comprises import wizards. In some embodiments, the system can convert third party applications into system applications. In some embodiments, third party applications include one or more of FactoryTalk™, ME/SE, PanelMate™, or PanelBuilder™ 32, as non-limiting examples. In some embodiments, the import wizard allows the user to save time in conversion from a previously third party designed application into one or more of the system's HMI applications.

In some embodiments, the system comprises intellectual property protection. In some embodiments, one or more of screens, documents, scripts and worksheets can be individually protected with just a few mouse clicks. In some embodiments, protection comprises the use of authentication devices or software. In some embodiments, authentication devices or software comprises the use of one or more of retinal, fingerprint, and/or or passwords, as non-limiting examples. In some embodiments, authentication prevents unauthorized viewing or editing of a project and/or application.

In some embodiments, the system comprises JavaScript custom widgets. In some embodiments, the custom widgets allow the user to integrate one or more of 3rd party, reusable JavaScript, Hypertext Markup Language 5 (HTML5), and/or Cascading Style Sheets (CSS) interface properties and/or events to expand and enhance the graphical interface (e.g., HMI).

In some embodiments, the system comprises multi-language support. In some embodiments, the system can allow the user to develop an application in one or more development languages. In some embodiments, development languages comprise one or more of English, Portuguese, German, French, Russian, Chinese Traditional and Simplified, Spanish, and/or any other language. The system allows the user to use translation tools to switch the runtime to any language according to various embodiments. In some embodiments, the system's HMI offers automatic font replacement based on the language selected.

In some embodiments, the system comprises a multi-touch interface. In some embodiments, a multi-touch interface allows users to develop applications for any touch screen device. In some embodiments, the system comprises using familiar, modern interface gestures. In some embodiments, interface gestures comprise swiping, pinch zooming, and panning. In some embodiments, gestures allow the use to perform actions. In some embodiments, actions comprise one or more of rotating graphics, docking screens, taking advantage of features like dual-touch command, and swiping to change screens and/or any other commands.

In some embodiments, the system comprises support for .NET and ActiveX. In some embodiments, .NET and ActiveX allows a user to add 3rd party controls to enhance a project. In some embodiments, the system HMI is a container for ActiveX and .NET controls. In some embodiments, .NET and ActiveX. allow the user to add functionality such as browsers, media players, charting, live streaming from cameras, and/or other ActiveX or .NET controls to the system.

In some embodiments, the system comprises native Open Platform Communications (OPC) interfaces. In some embodiments, OPC comprises one or more of OPC User Agent (UA) (Client/Server), OPC Desktop Administration (DA) (Client/Server), OPC Extensible Markup Language (XML) (Client), and OPC Head Disk Assembly (HDA) (Server). In some embodiments, OPC UA and OPC DA also offer native redundancy configuration and/or tag integration for OPC DA and OPC UA servers.

In some embodiments, the system comprises a PDF writer. In some embodiments, the system can send alarms, reports, or any file. In some embodiments, alarms, reports, or files are sent to one or more of a production supervisor, quality manager, and/or maintenance staff using a PDF writer and/or any other system communication method.

In some other embodiments, the system comprises an operators first platform with real-time advisory that can support the operator to make the right decisions, and can leverage historical data and operator actions to suggest potential or appropriate responses. Some embodiments comprise suggested alarm responses (e.g., the last time this alarm occurred, this action was taken), and/or operational confidence (e.g., this action appeared to resolve the process anomaly last time), and/or a leverage of engineering information about the asset or process to ensure right guidance is provided.

In some embodiments, the system comprises recipe management tools. In some embodiments, recipe management tools comprise using the system to load settings directly to Programming Logic Controllers (PLCs) and/or editing settings before loading settings to a PLC. In some embodiments, the system can use a simulator to evaluate the effects of a PLC change. In some embodiments, the system allows consistency to be maintained by automating part parameter changes and/or production quantities using flexible recipe management tools. In some embodiments, automating part parameter changes comprises implementing recipe and/or setting changes to multiple process systems simultaneously and/or at scheduled intervals.

In some embodiments, the system comprises the ability to create clear, concise reports. In some embodiments, reports comprise one or more of plain text, Rich Text Format (RTF), Extensible Markup Language (XML), Portable Document Format (PDF), HTML, and Comma Separated Value (CSV), and/or integration with Microsoft Office programs. In some embodiments, non-limiting examples of Microsoft Office programs comprise Excel, Word, and PowerPoint.

In some embodiments, the system comprises the ability to use the same development environment to design and deploy projects to a wide range of platforms. In some embodiments, platforms can comprise Linux, VxWorks, Windows Embedded 7/8, Windows 7/8/10, Windows 10 IoT Enterprise (LTSB/LTSC), and Windows Server 2012/2016 editions, as non-limiting examples.

In some embodiments, the system comprises a scheduler. In some embodiments, the scheduler allows a user to schedule application behavior triggered by changes recorded by the system. In some embodiments, changes comprise one or more of tag changes, date/time, frequency, and/or anything established as trigger. In some embodiments, the scheduler can be used in simulation. In some embodiments, the scheduler can trigger reports and/or other functionality at a time of day. In some embodiments, the scheduler can read/write reports at any scan rate.

In some embodiments, data analytics/machine learning capabilities can be implemented to map actions to positive and negative performance outcomes, helping to provide recommendations for operators based on past performance. In some embodiments, this builds upon the connectivity and visualization capabilities to support "what if" scenarios, not only based upon relationships derived from the model, but including historical performance to give insights into the likelihood of problems occurring or changes improving results.

In some embodiments, the system comprises scripting capability. In some embodiments, the system comprises built-in functions such as standard VBScript, for example. In some embodiments, the range of scripting support allows the user to take advantage of widely available resources for scripting platforms. In some embodiments, both the native system scripting language and third-party scripting languages can be used simultaneously to give the user the functionality needed, even from thin clients. In some embodiments, script debugging tools for the native VBScript editor comprise break-points and/or a variable watch list to improve scripting productivity.

In some embodiments, the system comprises security features which comprises support for one or more of group and user accounts, e-signatures, user passwords, and traceability.

In some embodiments, the system comprises studio mobile access. In some embodiments, studio mobile access comprises a multiple document interface that allows a user to access the system and/or the system's graphical interface (e.g., HMI) from any computer with a browser. In some embodiments, computers with a browser comprise iPads, iPhones, Android smartphones, and/or Windows computers, as non-limiting examples. In some embodiments, the system comprises support to integrate third-party web-based control. In some embodiments, integrating third-party web-based controls and apps comprise the use of plugins and application programming interfaces (APIs).

In some embodiments, the system comprises a symbols library. In some embodiments, the library comprises one or more of push buttons, pilot lights, tanks, sliders, meters, motors, pipes, valves and other common objects. In some embodiments, existing symbols can be modified to suit the user's needs. In some embodiments, the user can create a symbol from scratch. In some embodiments, the system also supports 3rd party symbol libraries and graphic tools.

In some embodiments, the system comprises a tag database. In some embodiments, the tag database is an object-oriented database. In some embodiments, an object oriented database comprise one or more of boolean, integer, real, strings, arrays, classes (structures), indirect tags and/or included system tags. In some embodiments, built-in functions comprise allow the user to do one or more of creating, deleting, an/or modifying the tag database settings during the runtime. In some embodiments, a tag database increases the flexibility to design generic templates that can be easily customized to each project, even during the runtime. In some embodiments, the system also offers tag integration from a wide range of PLCs.

In some embodiments, the system comprises trend analysis. In some embodiments, trend analysis comprises one or more of real-time trends and/or historical trends. In some embodiments, data can be logged in binary format. In some embodiments, data can be logged to any local or remote SQL database. In some embodiments, data can be logged to the system's historian database. In some the system comprises the capability to color or fill trends with graphic elements to enhance clarity of data. In some embodiments, date/time based and/or numeric (X/Y plot) trends give the user the flexibility to display information that best suits an application. In some embodiments, the system supports vertical and horizontal trending.

In some embodiments, the system comprises troubleshooting. In some embodiments, the user can quickly debug and verify a project using local and remote tools for troubleshooting. In some embodiments, troubleshooting tools comprise one or more of status fields, HTML5 based Database Spy for IoTView, DatabaseSpy and LogWin, as well as any other troubleshooting tools. Some embodiments use AI and/or machine learning for troubleshooting. In some embodiments, the system can capture screen open and close times. In some embodiments, the system can provide communications in real-time. In some embodiments, the system can comprise providing messages related to one or more of OPC, recipes/reports, security, database errors and/or custom messages.

In some embodiments, the system comprises a process model simulator. In some embodiments, the simulator optimizes plant performance. In some embodiments, the simulator improves process design, operational analysis and/or performing engineering studies. In some embodiments, the simulator is designed to perform rigorous heat and material balance calculations for a wide range of processes. In some embodiments, the simulator offers all types of models to support every industry.

In some embodiments, the simulator allows the user to do one or more of the following: design new processes; evaluate alternate plant configurations; modernize or revamp existing plants; assess and document compliance within environmental regulations; troubleshoot and debottleneck plant processes; monitor, optimize, and/or improve plant yields and/or profitability.

In some embodiments, the simulator comprises one or more of the following features: comprehensive thermodynamics and physical property data; creation and management of custom component data; comprehensive rigorous unit operation modeling; customizable process modeling via Microsoft® Excel; built-in integration with Excel for custom reporting; SIM4ME™ Portal integration for simulation control and analysis from Excel; availability via the cloud in addition to onsite access.

In some embodiments, the simulator comprises general flowsheet models. In some embodiments, the simulator can model one or more of the following: shell and tube exchangers, simplified exchangers, Liquified Natural Gas (LNG) exchangers, fired heaters, air cooled exchangers, heating/cooling curves, and/or zone analysis, dryers, and/or scorched particle detectors, as non-limiting examples. In some embodiments, the simulator comprises modeling one or more of flash, valves, compressors, expanders, pumps, pipes, and/or membrane separator models, as non-limiting examples. In some embodiments, the simulator comprises providing integration of custom units using an Excel unit operation.

In some embodiments, the simulator comprises flowsheet control. In some embodiments, flowsheet control comprises one or more of the following: feed-forward controllers, feedback controllers, multivariable controllers, Risk-based Maintenance (RBM), parameter cross-referencing, and/or auto-sequencing, as non-limiting examples.

In some embodiments, the simulator comprises polymer modeling. In some embodiments, the simulator comprises modeling continuous stirred tank reactors, plug flow reactors, and wiped film evaporators, as non-limiting examples. In some embodiments, the simulator comprises modeling kinetics mechanisms such as homogeneous Ziegler-Natta, chain polymerization, and condensation polymerization, as well as any other polymer process.

In some embodiments, the simulator comprises distillation modeling. In some embodiments, the simulator comprises modeling one or more of the following: multiple advanced solution algorithms, multiple initial estimate generators, two/three phase distillation, electrolytic distillation, reactive and batch distillation, liquid-liquid extraction, column and tray sizing or rating, thermosiphon reboilers, as well as any other process.

In some embodiments, the simulator comprises solids modeling. In some embodiments, the simulator comprises modeling one or more of the following: solid fuel gasification, counter current decanter (CCD), centrifuges, rotary drum filters, dryers, solid separators, cyclones, as well as any other process.

In some embodiments, the simulator comprises reactor modeling. In some embodiments, the simulator comprises modeling one or more of the following: conversion & equilibrium reactors, plug flow reactors, continuous stirred tank reactors, shift & methanation reactors, boiling pot reactors, batch reactors, inline FORTRAN reaction kinetics, Gibbs free energy minimization, as well as any other process.

In some embodiments, the simulator comprises cost estimation modeling. In some embodiments, the simulator comprises proving estimates at any stage in development. In some embodiments, the simulator can provide early phase conceptual estimates. In some embodiments, the simulator can provide definitive and detailed estimates that provide comprehensive, accurate cost evaluations along the lifecycle of a project.

In some embodiments, the simulator comprises capability for add-on modules. In some embodiments, add-on modules comprise modules designed to be integrated into the system. In some embodiments, the system comprises creating simulator interfaces to work together with third-party software. In some embodiments, third-party software comprises licensable add-ons. In some embodiments, add-on modules extend the functionality of the simulator in various ways such as, for example, Excel integration, electrolytic modeling, and/or rate-based distillation.

In some embodiments, the simulator comprises operation training. In some embodiments, a copy of the entire manufacturing facility can be modeled using the simulator. In some embodiments, process changes can be made in the simulation without affecting the real process model. In some embodiments, the simulator can be used for one or more of the following: training operators on the user interface, running drills, providing training for new equipment and/or system upgrades, and/or any other type of training need. In some embodiments, training simulation models can be integrated into the system as the actual control interface for a facility or other process.

Some embodiments of the invention include integration of data from distributed assets in a distributed environment for context-driven display of 3D models, equipment data specifications, maintenance records, related events, and/or drawings and piping and instrumentation diagrams ("P&IDs") integrated into a supervisory control and data acquisition (hereinafter "SCADA") operator interface. In some embodiments, the SCADA operator interface can present information to an operator or user about the state of a process such as one or more distributed assets including one or more distributed components of a process control and/or manufacturing information system of a distributed environment. In some embodiments, the SCADA operator interface can function as a human-machine interface ("HMI") enabling intake and processing of an operators control instructions. In some embodiments, at least a portion of the SCADA can comprise at least one program module including program logic tangibly stored on at least one non-transitory computer-readable storage medium of the system that includes at least one processor coupled to the non-transitory computer-readable storage medium for processing one or more logic codes of the program logic to perform one or methods of the invention.

Some embodiments of the invention include an engineering information management system ("Application NET") that is integrated into an operator interface operations management interface (OMI) (e.g., "InTouch®") that automatically presents content-based and/or context-based asset information to operators (also known as users). In some embodiments, the OMI can be configured to display a 3D representation of where one or more assets (e.g., such as equipment) exist in context to other equipment. Further, in some embodiments, the OMI can be configured to provide specific data specifications of the equipment, and traditional SCADA real-time visualizations of operational data. In some embodiments, at least a portion of the Application NET can comprise at least one further program module including program logic tangibly stored on at least one non-transitory computer-readable storage medium of the system that includes at least one processor coupled to the non-transitory computer-readable storage medium for processing one or more logic codes of the program logic to perform one or methods of the invention.

In some embodiments of the invention, the system can enable the user/operator to navigate either the operational model (within the SCADA system) or the engineering model (within Application NET), or both, where the display adjusts automatically to the changing context and shows the user appropriate contextual information. For example, in one embodiment, a navigation module executable by a processor can vary a displayed context of a virtual representation of a distributed asset. In some embodiments, such a system can display controls for graphically manipulating a virtual representation of an asset, where the displayed context of a component of an asset can be dynamically variable based on user selection and/or a context relationship of one component versus another component.

Some embodiments of the invention described herein can assist in reducing system or equipment downtime, and can increase efficiency through the automated reuse of engineering information available in Application NET such as 3D models, drawings and piping and instrumentation diagrams, maintenance records, standard operating procedures, vendor documents, etc.

Some embodiments of the invention described herein can increase operator efficiency and situational awareness by responding to, as well as driving, context changes in the operations management interface applications.

Some embodiments of the invention described herein can secure improved item identification in information exchange between the operator and maintenance engineers as different naming conventions between the operations and engineering models are bridged.

In some embodiments, when an operator selects an item in one of the operations applications (e.g. in response to a condition such as an alarm), the item's context, including the name and path of the selected item, can be propagated to all applications in the runtime OMI framework including the Application NET application.

In some embodiments, as an item often is named differently in the process model (e.g., in an "InTouch®" OMI) and in the engineering model (e.g., an Application NET): some embodiments of the invention can leverage the name alias and look-up features of the system to find the corresponding item.

In some embodiments, the system can display the engineering name of the item, its 3D representation in the context of the plant, configured engineering attributes, 2D diagrams, and other referenced documents.

In some embodiments, the operator can also navigate engineering 3D model or 2D diagrams to investigate the possible root cause of one or more conditions. In some embodiments, the OMI framework context and thus other applications can be updated to display the appropriate data accordingly.

Some embodiments of the invention include an OMI that provides an interface to create operator interfaces which react to context changes showing the user the correct information needed to make decisions, and providing navigation through data for rapid problem solving without leaving the application.

Some embodiments of the systems and methods described herein include delivering additional services to an install base of a software platform (e.g., such as AVEVA HMI). In some embodiments, the system can enable capturing a market leading position in industrial cloud by connecting an existing software platform install base (e.g., an install base of AVEVA HMI) to digital services that cover operations, assets and engineering life cycles. In some embodiments, the systems and methods can encourage customer adoption through the essential plan, a free subscription that adds value to their operations and provides a path to greater adoption of hybrid architectures. Some embodiments can ensure a cloud platform is the natural choice for users moving from on premise to cloud hosted or hybrid HMI applications. Some embodiments can extend customer share of wallet through offering linked engineering capabilities made available through legacy software offers.

DETAILED DESCRIPTION

Figure 1:
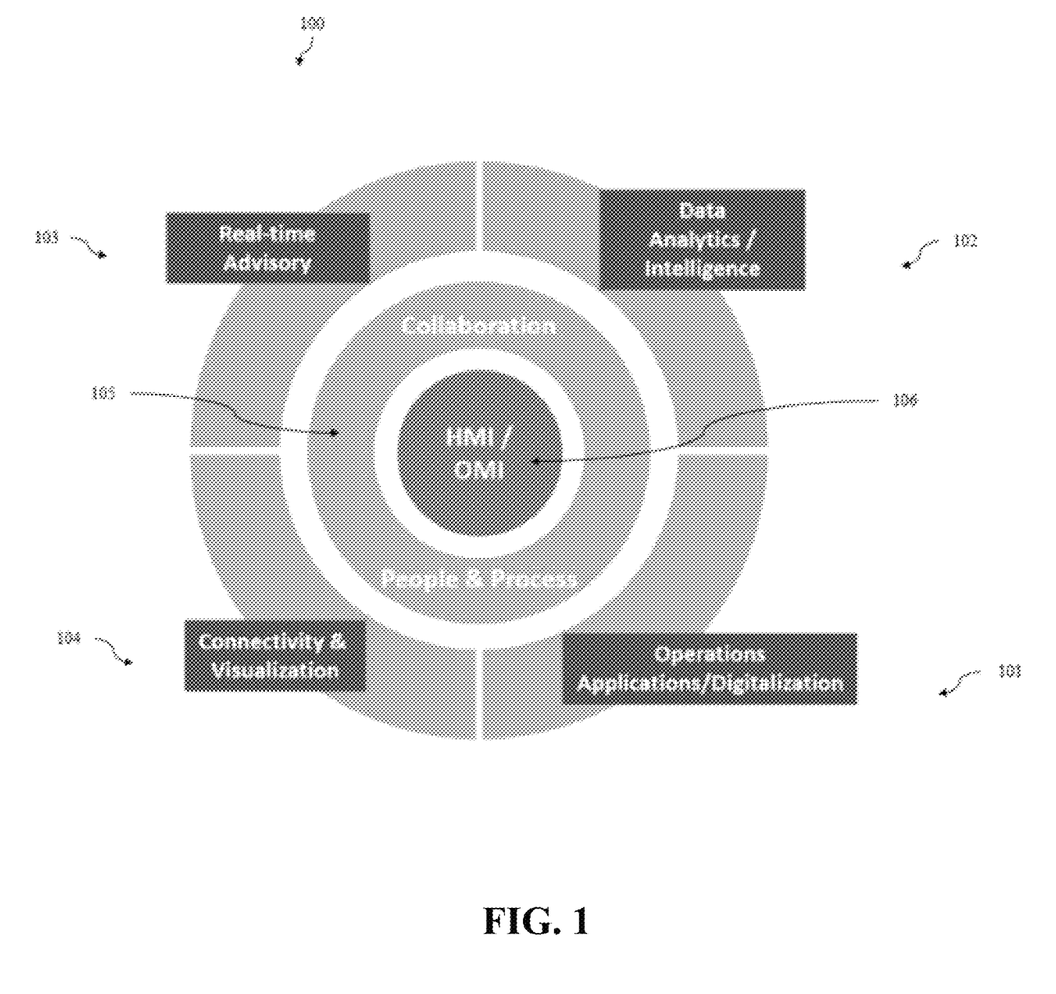
FIG. 1 shows a system architecture according to some embodiments.

FIG. 1 shows a system architecture 100 according to some embodiments. In some embodiments, the system architecture 100 comprises one or more of: at least one computer 105; at least one processor; at least one non-transitory computer-readable medium; at least one operations applications software 101; at least one data analytics software 102; at least one real-time advisory software 103; at least one connectivity and visualization software 104; at least one human machine interface (HMI). In some embodiments, each of the respective software comprises code, the code being machine-executable code comprising instructions that can be stored on the computer and/or at least one non-transitory computer-readable medium and executed by the computer and/or at least one processor. In some embodiments, the computer 105 comprises the at least one processor and/or the at least one non-transitory computer-readable medium.

In some embodiments, the at least one operations applications software 101 comprises instructions for interfacing with one or more factory systems. In some embodiments, the at least one operations applications software 101 comprises instructions for collecting data from one or more factory systems. In some embodiments, the at least one operations applications software 101 comprises instructions for storing data from one or more factory systems.

According to various embodiments, the analytics software 102 comprises instructions interface with the at least one operations applications software and/or perform analytics on the stored data. The interface, such as a communication network, is described in more detail in FIG. 7.

According to some embodiments, the real-time advisory software 103 comprises instructions for interfacing with said at least one data analytics software. In some embodiments, the real-time advisory software can generate action items based on the analytics.

In various embodiments, the one connectivity and visualization software 104 comprises instructions to interface (i.e., use the networks described below) with one or more of the at least one operations applications software 101, the at least one data analytics software 102, and/or, the at least one real-time advisory software 103. In some embodiments, the one connectivity and visualization software 104 generates reports based on the collected data and/or the analytics. In some embodiments, the one connectivity and visualization software 104 facilitate connections among multiple computers to send and receive data.

According to some embodiments, the HMI 106 comprises instructions configured and arranged to facilitate an HMI interface (interfaces described further below) with one or more of the at least one operations applications software, the at least one data analytics software, the at least one real-time advisory software and/or, the at least one connectivity and visualization software. In some embodiments, the HMI 106 can display data from one or more of the previously mentioned software. In some embodiments, the HMI 106 allows a user to manipulate the displayed data. In some embodiments, the HMI 106 allows a user to request additional reports and or data from one or more software.

Figure 2:
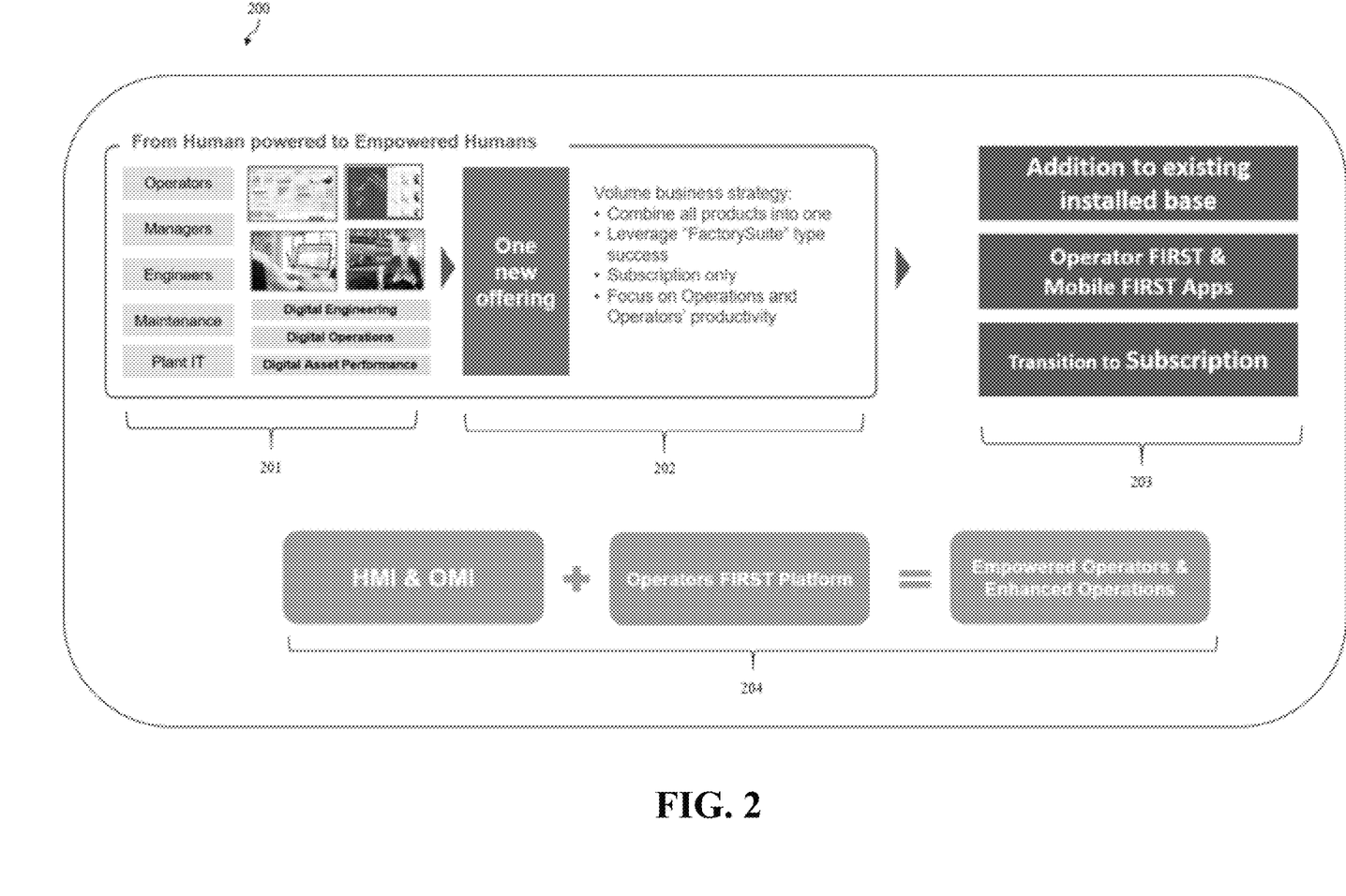
FIG. 2 describes the implementation of the system according to some embodiments.

FIG. 2 describes the implementation of the system according to some embodiments. In some embodiments, as shown in 200, the system 100 combines multiple separate manufacturing resources 201 a consolidate system 202. In some embodiments, the separate manufacturing resources 201 comprise operators, engineers, managers, maintenance, plant information technology (IT) digital engineering, digital operations, and digital asset performance, as non-limiting examples. In some embodiments, the consolidate system 202 combines all manufacturing resources 201 into one cooperative, interconnected, consolidated system 202 (the system 100 comprises the consolidate system 202). In some embodiments, as shown at 203 the consolidated system 202 is available by subscription comprising operator FIRST and Mobile FIRST applications in addition to the existing installed base systems. In some embodiments, the consolidated system 202 focuses on operations and operator productivity. In some embodiments, the consolidated system 202 provides an integration software to combine both old and new software and systems. In some embodiments, old and new software and systems comprise separate factory systems comprising software applications from one or more third-party vendors. In some embodiments, the one or more third-party vendor software applications are not compatible with other third-party vendor software applications. In some embodiments, the consolidated system functions similarly to FactorySuite®. In some embodiments, the consolidated system comprises FactorySuite®. In some embodiments, as shown at 204, the combination of HMI OMI, and an operators FIRST platform results in empowered operators and enhanced operations.

Figure 3:
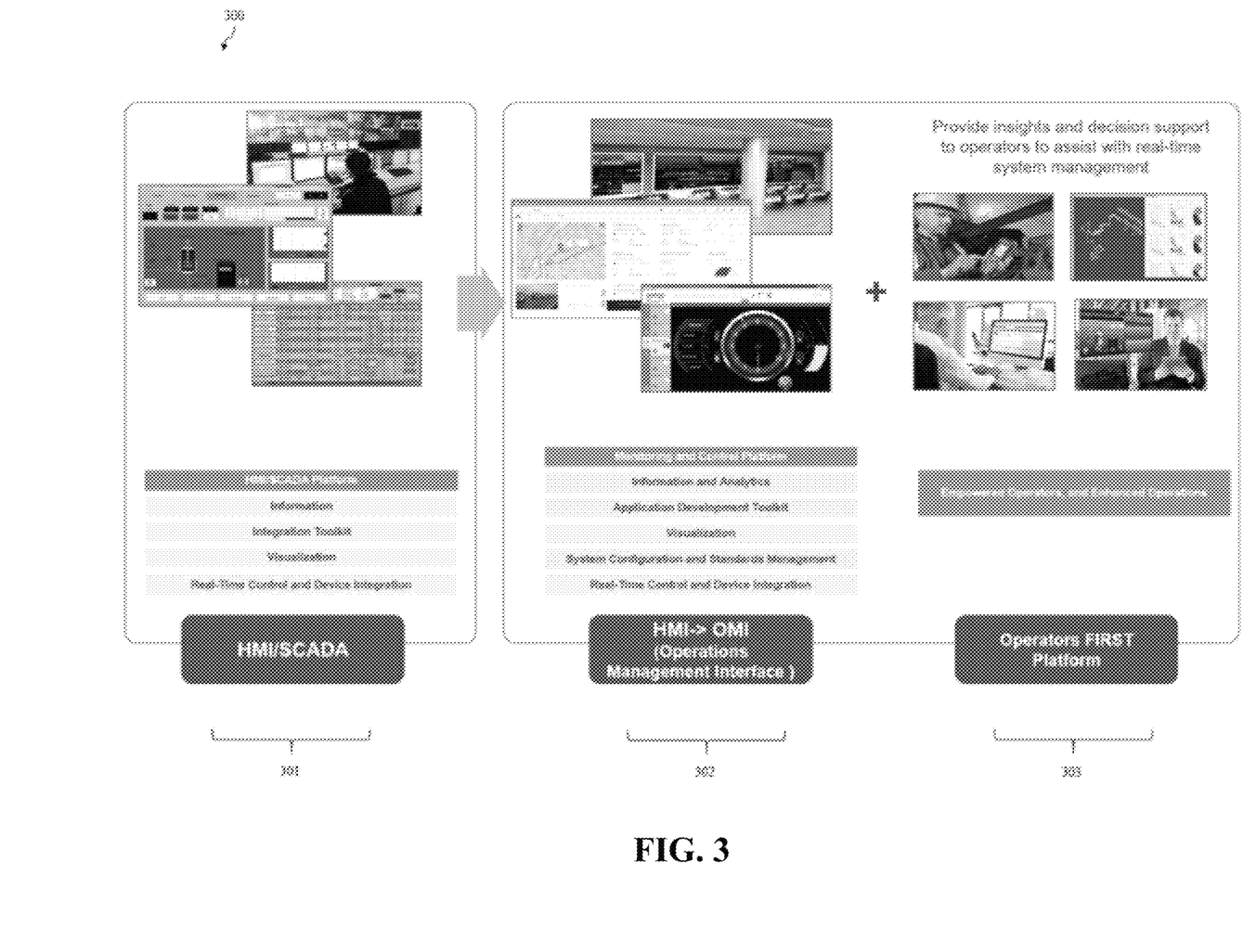
FIG. 3 depicts further details of the enhanced operation portion of FIG. 2 according to some embodiments.

FIG. 3 depicts further details 300 of the enhanced operation portion 204 of FIG. 2. according to some embodiments. In some embodiments, as shown at 301, the HMI 106 comprises SCADA. In some embodiments, the HMI 106 comprises information, an integration toolkit, visualization, and real-time control and computer integration. In some embodiments, the HMI 106 comprises an operations management interface (OMI). In some embodiments, as shown at 302, the HMI 106 and/or OMI monitors and controls the system platform. In some embodiments, monitoring and controlling comprises information and analytics, an application development toolkit, visualization, system configuration and standards management, and real-time control and device integration. Some embodiments of the systems and methods shown include delivering additional services to an install base of a software platform (e.g., such as AVEVA HMI). In some embodiments, the system can enable capturing a market leading position in industrial cloud by connecting an existing software platform install base (e.g., an install base of AVEVA HMI) to digital services that cover operations, assets and engineering life cycles. In some embodiments, as shown at 303, the HMI 106 comprises and/or interfaces with an operators FIRST platform that provides insights and decision support to operators to assist with real-time system management.

According to some embodiments, the system 100 comprises data analytics software. In some embodiments, the data analytics software comprises one or more of artificial intelligence (AI) and/or machine learning performing the analytics.

Figure 4:
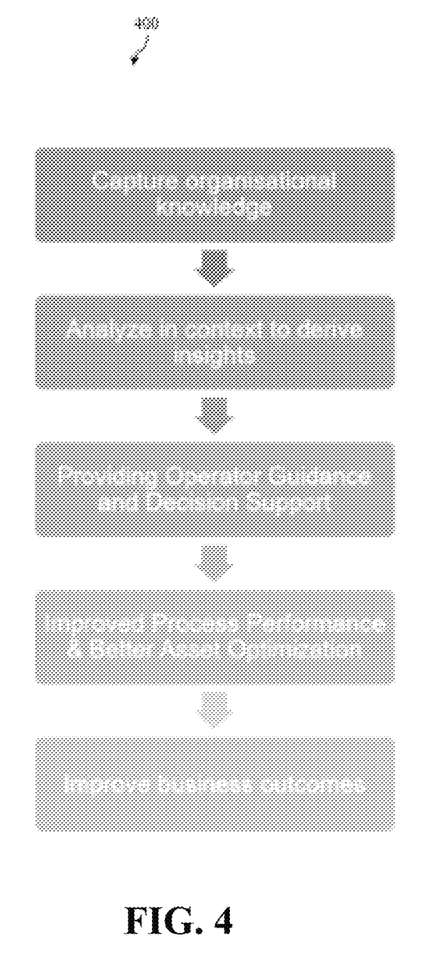
FIG. 4 depicts a flowchart of steps associated with the system of FIG. 1 according to some embodiments.

FIG. 4 depicts a flowchart of steps associated with the system of FIG. 1 according to some embodiments. In some embodiments, as shown in 400, the system captures organizational knowledge, analyzed the knowledge in context to derive insights, provides operator guidance and decision support. This results in improved process performance, better asset optimization, and improved business outcomes according to various embodiments.

Figure 5:
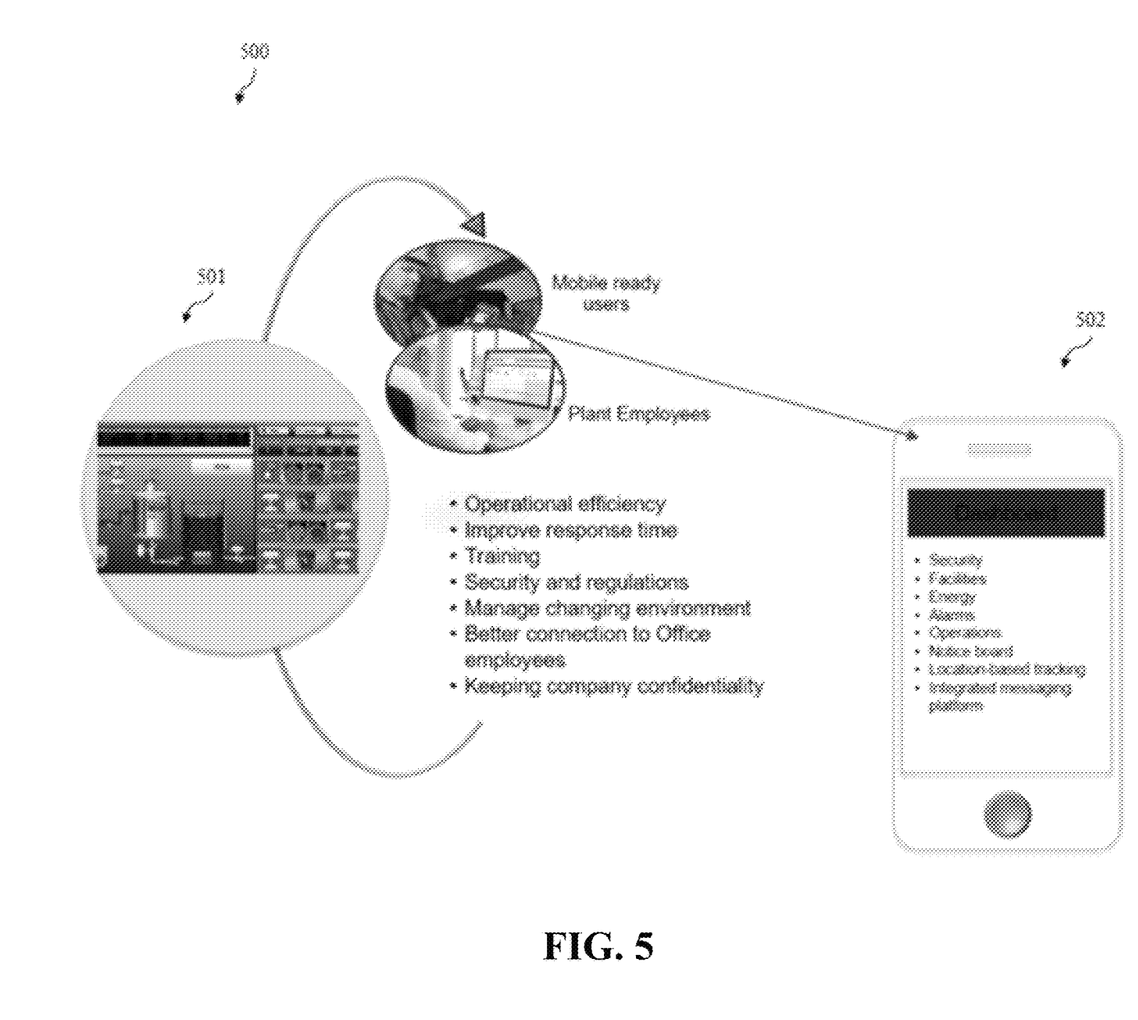
FIG. 5 depicts the system displaying key information on a large display and/or mobile display according to some embodiments.

FIG. 5 depicts the system displaying key information on a large display 501 and/or mobile display 502 according to some embodiments. In some embodiments, all information on large display 501 is shown on mobile display 502. In some embodiments, mobile display shows only a portion of information that can be displayed on large display 501. In some embodiments, mobile display 502 displays a text summary of key information that can be displayed on large display 501.

Figure 6:
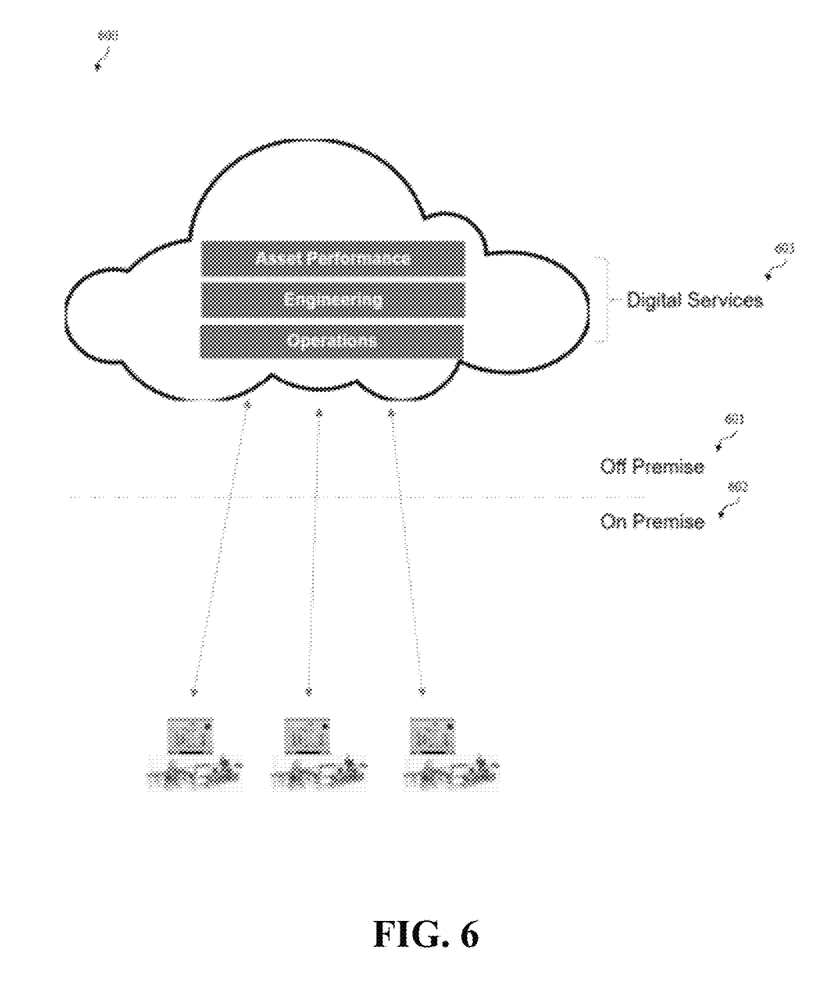
FIG. 6 depicts a cloud based and/or hybrid system according to some embodiments.

FIG. 6 depicts a cloud based and/or hybrid system 600 according to some embodiments. In some embodiments, the system 100 comprises the cloud based and/or hybrid system 600. In some embodiments, the cloud portion 601 is located off premise from the factory systems 602, which are located on premise. In some embodiments, digital services 603 are at both the on premise 602 and off premise 601 locations in a hybrid configuration. In some embodiments, digital services 603 in all premises are synchronized and stored at one or more premises.

Figure 7:
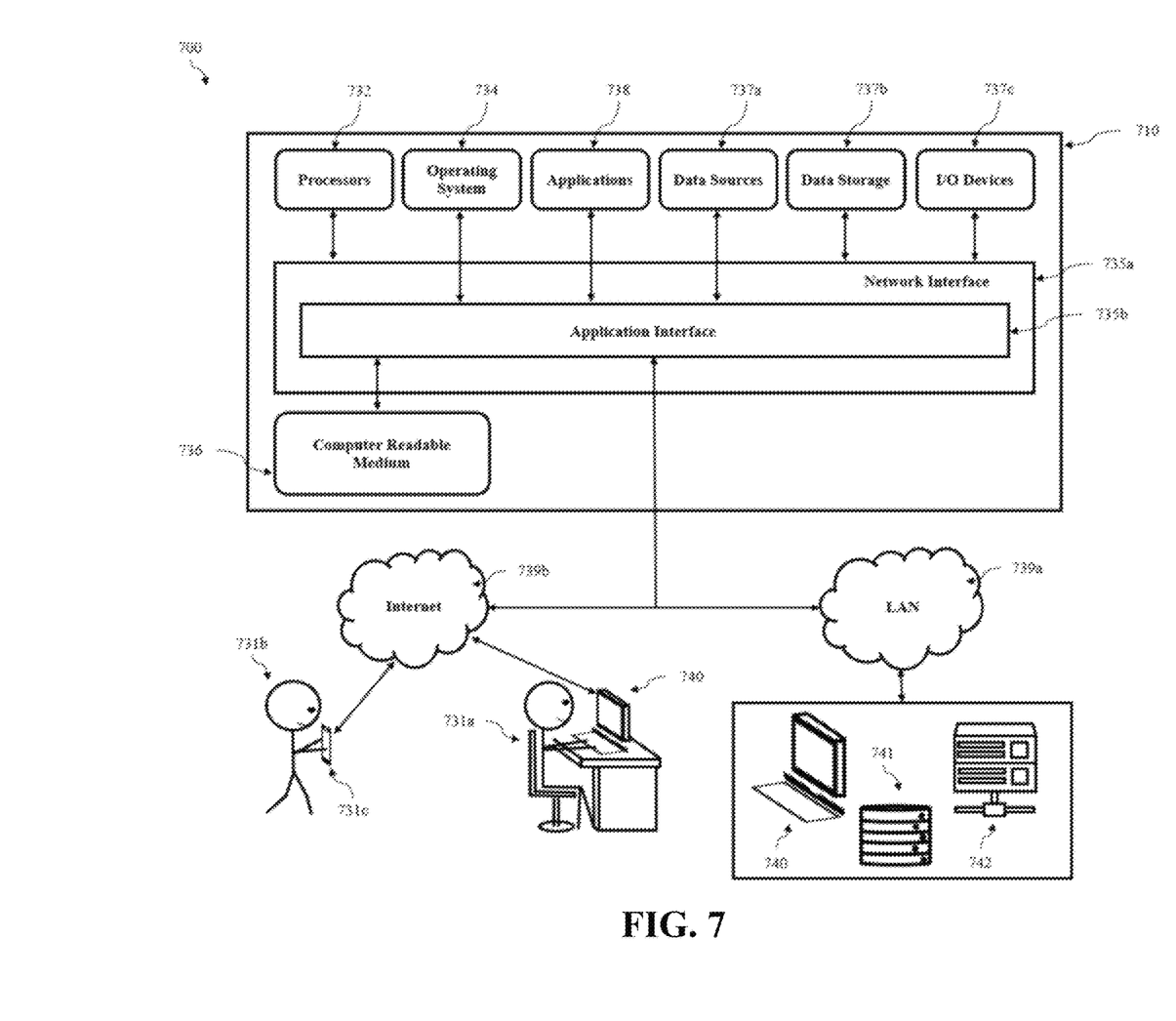
FIG. 7 illustrates a computer system enabling or comprising the systems and methods in accordance with some embodiments.

FIG. 7 illustrates a computer system enabling or comprising the systems and methods in accordance with some embodiments. In some embodiments, the computer system 710 can include and/or operate and/or process computer-executable code of one or more of the above-mentioned software modules and/or systems. Further, in some embodiments, the computer system 710 can operate and/or display information within one or more graphical user interfaces (GUIs) using a computer. In some embodiments, the computer system 710 can comprise the cloud and/or can be coupled to one or more cloud-based server systems.

In some embodiments, the system 710 can comprise at least one computer including at least one processor 732. In some embodiments, the at least one processor 732 can include a processor residing in, or coupled to, one or more server platforms. In some embodiments, the system 710 can include a network interface 735a and an application interface 735b coupled to the least one processor 732 capable of processing at least one operating system 734. Further, in some embodiments, the interfaces 735a, 735b coupled to at least one processor 732 can be configured to process one or more of the software modules (e.g., such as enterprise applications 738). In some embodiments, the software modules 738 can include server-based software, and can operate to host at least one user account and/or at least one client account, and operating to transfer data between one or more of these accounts using the at least one processor 732.

The invention can employ various computer-implemented operations involving data stored in computer systems according to some embodiments. Moreover, the above-described databases and models described throughout can store analytical models and other data on computer-readable storage media within the system 710 and on computer-readable storage media coupled to the computer system 710 in some embodiments. In addition, in some embodiments, the above-described applications of the system can be stored on computer-readable storage media within the computer system 710 and on computer-readable storage media coupled to the computer system 710. These operations, according to various embodiments, are those requiring physical manipulation of physical quantities. Usually, though not necessarily, in some embodiments these quantities take the form of electrical, electromagnetic, or magnetic signals, optical or magneto-optical form capable of being stored, transferred, combined, compared and otherwise manipulated. In some embodiments, the system 710 can comprise at least one computer readable medium 736 coupled to at least one data source 737a, and/or at least one data storage 737b, and/or at least one input/output 737c. In some embodiments, the computer system can be embodied as computer readable code on a computer readable medium 736. In some embodiments, the computer readable medium 736 can be any data storage that can store data, which can thereafter be read by a computer system (such as the system 710). In some embodiments, the computer readable medium 736 can be any physical or material medium that can be used to tangibly store the desired information or data or instructions and which can be accessed by a computer or processor 732. In some embodiments, the computer readable medium 736 can include hard drives, network attached storage (NAS), read-only memory, random-access memory, FLASH based memory, CD-ROMs, CD-Rs, CD-RWs, DVDs, magnetic tapes, other optical and non-optical data storage. In some embodiments, various other forms of computer-readable media 736 can transmit or carry instructions to a computer 740 and/or at least one user 731, including a router, private or public network, or other transmission apparatus or channel, both wired and wireless. In some embodiments, the software modules 738 can be configured to send and receive data from a database (e.g., from a computer readable medium 736 including data sources 737a and data storage 737b that can comprise a database), and data can be received by the software modules 738 from at least one other source. In some embodiments, at least one of the software modules 738 can be configured within the system to output data to at least one user 731 via at least one graphical user interface rendered on at least one digital display.

In some embodiments, the computer readable medium 736 can be distributed over a conventional computer network via the network interface 735a where the system embodied by the computer readable code can be stored and executed in a distributed fashion. For example, in some embodiments, one or more components of the system 710 can be coupled to send and/or receive data through a local area network ("LAN") 739a and/or an internet coupled network 739b (e.g., such as a wireless internet). In some further embodiments, the networks 739a, 739b can include wide area networks ("WAN"), direct connections (e.g., through a universal serial bus port), or other forms of computer-readable media 336, or any combination thereof.

In some embodiments, components of the networks 739a, 739b can include any number of user computers such as personal computers including for example desktop computers, and/or laptop computers, or any fixed, generally non-mobile internet appliances coupled through the LAN 739a. For example, some embodiments include personal computers 740a coupled through the LAN 739a that can be configured for any type of user including an administrator. Other embodiments can include personal computers coupled through network 739b. In some further embodiments, one or more components of the system 710 can be coupled to send or receive data through an internet network (e.g., such as network 739b). For example, some embodiments include at least one user 731 coupled wirelessly and accessing one or more software modules of the system including at least one enterprise application 738 via an input and output ("I/O") 737c. In some other embodiments, the system 310 can enable at least one user 731 to be coupled to access enterprise applications 738 via an I/O 737c through LAN 739a. In some embodiments, the user 731 can comprise a user 731a coupled to the system 710 using a desktop computer, and/or laptop computers, or any fixed, generally non-mobile internet appliances coupled through the internet 739b. In some further embodiments, the user 731 can comprise a mobile user 731b coupled to the system 710. In some embodiments, the user 731b can use any mobile computer 731c to wireless coupled to the system 710, including, but not limited to, personal digital assistants, and/or cellular phones, mobile phones, or smart phones, and/or pagers, and/or digital tablets, and/or fixed or mobile internet appliances.

According to some embodiments, any of the operations described herein that form part of the system are useful machine operations. The system also relates to an apparatus for performing these operations in some embodiments. In some embodiments, the apparatus can be specially constructed for the required purpose, such as a special purpose computer. When defined as a special purpose computer, in some embodiments, the computer can also perform other processing, program execution, or routines that are not part of the special purpose, while still being capable of operating for the special purpose. In various embodiments, the operations can be processed by a general-purpose computer selectively activated or configured by one or more computer programs stored in the computer memory, cache, or obtained over a network. When data is obtained over a network the data can be processed by other computers on the network, e.g. a cloud of computing resources in some embodiments.

The embodiments of the system can also be defined as a machine that transforms data from one state to another state. The data can represent an article, that can be represented as an electronic signal and electronically manipulate data in various embodiments. The transformed data can, in some embodiments, be visually depicted on a display, representing the physical object that results from the transformation of data. The transformed data can be saved in some embodiments to storage generally, or in formats that enable the construction or depiction of a physical and tangible object. In some embodiments, the manipulation can be performed by a processor. According to some embodiments, the processor transforms the data from one thing to another. Some embodiments include methods can be processed by one or more machines or processors that can be connected over a network. Each machine can transform data from one state or thing to another, and can also process data, save data to storage, transmit data over a network, display the result, or communicate the result to another machine in various embodiments. Computer-readable storage media, as used herein, refers to physical or tangible storage (as opposed to signals) and includes without limitation volatile and non-volatile, removable and non-removable storage media implemented in any method or technology for the tangible storage of information such as computer-readable instructions, data structures, program modules, instances, or other data according to some embodiments.

Although method operations can be described in a specific order, in some embodiments other housekeeping operations can be performed in between operations, or operations can be adjusted so that they occur at slightly different times, or can be distributed in a system which allows the occurrence of the processing operations at various intervals associated with the processing as long as the processing of the overlay operations are performed in the desired way.

It will be appreciated by those skilled in the art that while the system has been described above in connection with embodiments, drawings, and examples, the invention is not necessarily so limited: numerous other embodiments, examples, uses, modifications and departures from the presented embodiments are intended to be encompassed by the description herein. The invention is capable of other embodiments and of being practiced or of being carried out in various ways.

Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings, and includes any wireless connection that facilitates the transfer of data.

The word "computer" encompasses any one of or combination of one or more processors, computer-readable mediums (e.g., computer memory), displays, speakers, wired and wireless communication and data transfer components, clients, servers, APIs, databases, and related hardware and software according to some embodiments. In some embodiments, "computer" can also be a reference to a desktop computer, a smart phone, PDA, tablet, radio, and the like, any of which can comprise one or more of the software and hardware mentioned above.

In some embodiments, the local cloud computer can comprise Amazon Web Services (AWS) for example, but is broadly applicable to any other cloud platform such as Microsoft Azure.

AVEVA, the AVEVA logos and AVEVA product names are trademarks or registered trademarks of AVEVA Group plc or its subsidiaries in the United Kingdom and other countries. Windows and Azure are registered trademarks of Microsoft Corporation in the United States and other countries. Amazon and Amazon Web Services are registered trademarks of Amazon Incorporated.

The invention claimed is:

1. A system for consolidating multiple factory control platforms into a single interconnected platform, the system comprising:

at least one processor;
at least one non-transitory computer-readable medium;
at least one operations applications software;
at least one data analytics software;
at least one real-time advisory software;
at least one connectivity and visualization software;
at least one human machine interface (HMI);
wherein each of at least one real-time advisory software, at least one data analytics software, at least one applications software, and the at least one human machine interface each comprise respective machine executable instruction code, each said respective machine executable instruction code stored on the at least one non-transitory computer-readable medium, each said respective machine executable instruction code executed by the at least one processor;
wherein said at least one operations applications software comprises instructions configured and arranged to:
interface with one or more factory systems,
collect data from the one or more factory systems,
store data from the one or more factory systems;
wherein said at least one data analytics software comprises instructions configured and arranged to:
interface with the at least one operations applications software,
perform analytics on said stored data;
wherein said at least one real-time advisory software comprises instructions configured and arranged to:
interface with said at least one data analytics software,
generate action items based on said analytics;
wherein said at least one connectivity and visualization software comprises instructions configured and arranged to:
interface with one or more of the at least one operations applications software, the at least one data analytics software, and/or, the at least one real-time advisory software,
generate reports based on the collected data and/or the analytics,
facilitate connections among multiple computers;
wherein said at least one HMI comprises instructions configured and arranged to:
create an HMI interface with one or more of the at least one operations applications software, the at least one data analytics software, the at least one real-time advisory software and/or, the at least one connectivity and visualization software,
display data from the HMI interface,
manipulate the displayed data,
request additional reports.

2. The system of claim 1,
wherein said factory systems comprise separate software applications from one or more third-party vendors,
wherein said one or more third-party vendor software applications are not compatible with other third-party vendor software applications.

3. The system of claim 1,
wherein performing analytics on said stored data comprises one or more of:
artificial intelligence (AI) performing the analytics, and/or
machine learning performing the analytics.

4. The system of claim 1,
wherein the generating action items comprises one or more of:
creating a list to investigate root cause,
adjusting equipment parameters to improve quality,
creating a shut-down and/or start-up checklist.

5. The system of claim 1,
wherein the generating reports comprises one or more of:
collecting and aggregating the generated action items,
format reports based on user setting and or display parameters.

6. The system of claim 1,
wherein display data comprises commands, said commands comprising one or more of:
rotating graphics, docking screens, touch screed selection, and/or swiping.

7. A system for consolidating multiple factory control platforms into a single interconnected platform, the system comprising:
at least one computer configured and arranged to store and execute:
at least one operations applications software code;
at least one data analytics software code;
at least one real-time advisory software code;
at least one connectivity and visualization software code;
at least one human machine interface (HMI) code;
wherein said at least one operations applications software code comprises instructions configured and arranged to:
interface with one or more factory systems,
collect data from the one or more factory systems,
store data from the one or more factory systems;
wherein said at least one data analytics software code comprises instructions configured and arranged to:
interface with the at least one operations applications software code,
perform analytics on said stored data;
wherein said at least one real-time advisory software code comprises instructions configured and arranged to:
interface with said at least one data analytics software,
generate action items based on said analytics;
wherein said at least one connectivity and visualization software code comprises instructions configured and arranged to:
interface with one or more of the at least one operations applications software, the at least one data analytics software, and/or, the at least one real-time advisory software,
generate reports based on the collected data and/or the analytics,
facilitate connections among multiple computers;
wherein said at least one HMI code comprises instructions configured and arranged to:
create an HMI interface with one or more of the at least one operations applications software, the at least one data analytics software, the at least one real-time advisory software and/or, the at least one connectivity and visualization software,
display data from the HMI interface,
manipulate the displayed data,
request additional reports.

8. The system of claim 1,
wherein said factory systems comprise separate software applications from one or more third-party vendors,
wherein said one or more third-party vendor software applications are not compatible with other third-party vendor software applications.

9. The system of claim 7,
wherein performing analytics on said stored data comprises one or more of:
artificial intelligence (AI) performing the analytics, and/or
machine learning performing the analytics.

10. The system of claim 7,
wherein the generating action items comprises one or more of:
creating a list to investigate root cause,
adjusting equipment parameters to improve quality,
creating a shut-down and/or start-up checklist.

11. The system of claim 7,
wherein the generating reports comprises one or more of:
collecting and aggregating the generated action items,
format reports based on user setting and or display parameters.

12. The system of claim 7,
wherein display data comprises commands, said commands comprising one or more of:
rotating graphics, docking screens, touch screed selection, and/or swiping.

13. A method for consolidating multiple factory control platforms into a single interconnected platform, the method comprising providing:
at least one processor;
at least one non-transitory computer-readable medium;
at least one operations applications software;
at least one data analytics software;
at least one real-time advisory software;
at least one connectivity and visualization software;
at least one human machine interface (HMI);
wherein each of at least one real-time advisory software, at least one data analytics software, at least one applications software, and the at least one human machine interface each comprise respective machine executable instruction code, each said respective machine executable instruction code stored on the at least one non-transitory computer-readable medium, each said respective machine executable instruction code executed by the at least one processor;
wherein said at least one operations applications software comprises instructions configured and arranged to:
interface with one or more factory systems,
collect data from the one or more factory systems,
store data from the one or more factory systems;
wherein said at least one data analytics software comprises instructions configured and arranged to:
interface with the at least one operations applications software,
perform analytics on said stored data;
wherein said at least one real-time advisory software comprises instructions configured and arranged to:
interface with said at least one data analytics software,
generate action items based on said analytics;

wherein said at least one connectivity and visualization software comprises instructions configured and arranged to:

interface with one or more of the at least one operations applications software, the at least one data analytics software, and/or, the at least one real-time advisory software, generate reports based on the collected data and/or the analytics, facilitate connections among multiple computers;

wherein said at least one HMI comprises instructions configured and arranged to:

create an HMI interface with one or more of the at least one operations applications software, the at least one data analytics software, the at least one real-time advisory software and/or, the at least one connectivity and visualization software, display data from the HMI interface, manipulate the displayed data, request additional reports.

14. The method of claim 13, wherein said factory systems comprise separate software applications from one or more third-party vendors, wherein said one or more third-party vendor software applications are not compatible with other third-party vendor software applications.

15. The method of claim 13, wherein performing analytics on said stored data comprises one or more of:

artificial intelligence (AI) performing the analytics, and/or machine learning performing the analytics.

16. The method of claim 13, wherein the generating action items comprises one or more of:

creating a list to investigate root cause, adjusting equipment parameters to improve quality, creating a shut-down and/or start-up checklist.

17. The method of claim 13, wherein the generating reports comprises one or more of:

collecting and aggregating the generated action items, format reports based on user setting and or display parameters.

18. The method of claim 13, wherein display data comprises commands, said commands comprising one or more of:

rotating graphics, docking screens, touch screed selection, and/or swiping.

* * * * *